US011564274B2

(12) United States Patent
Novoa et al.

(10) Patent No.: US 11,564,274 B2
(45) Date of Patent: Jan. 24, 2023

(54) SYSTEM AND METHOD FOR ADAPTIVE DATA COMMUNICATION RADIO LINK AGGREGATION IN AN INFORMATION HANDLING SYSTEM

(71) Applicant: DELL PRODUCTS, LP, Round Rock, TX (US)

(72) Inventors: Manuel Novoa, Leander, TX (US); Daniel L. Hamlin, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 17/167,301

(22) Filed: Feb. 4, 2021

(65) Prior Publication Data

US 2022/0248485 A1 Aug. 4, 2022

(51) Int. Cl.
*H04L 12/24* (2006.01)
*H04W 76/15* (2018.01)
*H04W 28/02* (2009.01)
*H04W 72/04* (2009.01)
*H04W 36/28* (2009.01)
*H04W 36/30* (2009.01)

(52) U.S. Cl.
CPC ....... *H04W 76/15* (2018.02); *H04W 28/0268* (2013.01); *H04W 36/28* (2013.01); *H04W 36/30* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 9,715,333 B2 | 6/2017 | Spetalnick | |
| 2006/0022029 A1 | 2/2006 | Lin et al. | |
| 2015/0288599 A1* | 10/2015 | Zhou | H04L 45/70 370/338 |
| 2015/0289299 A1* | 10/2015 | Abraham | H04L 45/245 370/328 |
| 2017/0085278 A1* | 3/2017 | Emmanuel | H04B 1/0057 |
| 2017/0273028 A1* | 9/2017 | Medina Acosta | H04W 72/14 |
| 2018/0054724 A1* | 2/2018 | Cariou | H04W 8/005 |
| 2018/0167948 A1* | 6/2018 | Egner | H04W 76/16 |
| 2018/0343165 A1* | 11/2018 | Anantharaman | H04L 41/0886 |
| 2019/0159204 A1* | 5/2019 | Hahn | H04W 24/10 |
| 2019/0208424 A1* | 7/2019 | Egner | H04W 24/02 |
| 2020/0259737 A1* | 8/2020 | Koshy | H04W 40/28 |
| 2020/0336999 A1* | 10/2020 | O'Shea | H04B 1/406 |
| 2021/0204163 A1* | 7/2021 | Cohn | H04L 45/22 |

* cited by examiner

*Primary Examiner* — Sithu Ko
(74) *Attorney, Agent, or Firm* — Larson Newman, LLP (57) ABSTRACT

An information handling system includes a concurrent dual band (CDB) radio and a link aggregator. The CDB radio establishes a first data link on a first frequency band and concurrently establishes a second data link on a second frequency band different from the first frequency band. The link aggregator operates in a first mode to establish the first data link and the second data link with a first remote device, and operates in a second mode to establish the first data link with the first remote device and to establish the second data link with a second remote device different from the first remote device.

20 Claims, 6 Drawing Sheets

SYSTEM AND METHOD FOR ADAPTIVE DATA COMMUNICATION RADIO LINK AGGREGATION IN AN INFORMATION HANDLING SYSTEM

FIELD OF THE DISCLOSURE

This disclosure generally relates to information handling systems, and more particularly relates to adaptive data communication radio link aggregation in an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a concurrent dual band (CDB) radio and a link aggregator. The CDB radio may establish a first data link on a first frequency band and may concurrently establish a second data link on a second frequency band different from the first frequency band. The link aggregator may operate in a first mode to establish the first data link and the second data link with a first remote device, and may operate in a second mode to establish the first data link with the first remote device and to establish the second data link with a second remote device different from the first remote device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-5 illustrates connected environments which each include an information handling system, a docking station, an access point, and one or more monitors. Connected environments represent computing environments that are characterized by highly flexible connectivity between the elements of the connected environments via broad usage of wireless interconnectivity for discovery, authentication, control, data transfer, and the like, with an emphasis on flexible compute capabilities among the information handling systems, the docking stations, and the monitors. Interconnectivity between the elements of the connected environments may include mesh networks with other elements, not shown, such as storage arrays, other information handling systems, gaming servers, and the like. Typical wireless connectivity includes a single data communication radio that operates in one of two different frequency bands (such as 2.4 GHz and 5.0 GHz). That is, the data communication radio determines to operate over one frequency band or the other. For example, a laptop computer may connect to an access point via the 2.4 GHz band, either because the laptop computer and the access point are remotely situated or because one or more of the devices only supports the 2.4 GHz band. In another example, the laptop computer can connect to the access point via the 5.0 GHz band, either because the laptop computer and the access point are more closely situated or because both of the devices support the 5.0 GHz band. Here, it will be understood that the data bandwidth for the 5.0 GHz band is generally higher than the bandwidth for the 2.4 GHz band.

In the various embodiments, one or more of the elements of the connected environments utilize a concurrent dual band (CDB) data communication radio functionality. Here, a device with a CDB functionality can form wireless connections via both frequency bands of a data communication radio. In a first case, while each frequency band may be connected to a different device, the bandwidth of the data communication radio will be shared, for example via timesharing, between the frequency bands. In a second case, each frequency band may be utilized for its full bandwidth communications. Here, each frequency band may be understood as a separate data communication radio. In another embodiment, one or more of the elements of connected environment 100 may include multiple dual-band data communication radios. For example, a docking station may include two CDB data communication radios, the first for connecting to an information handling system, and the second for connecting to an access point or the like. Hereinafter, a CDB data communication radio will be referred to as a CDB radio.

The information handling systems each represent a computer system such as a laptop computer, a workstation, a connected device like a smart cellular telephone or tablet device, or the like. The docking stations each represent devices that operates to expand the functionality of the associated information handling systems. For example, where an information handling system represents a laptop computer, the associated docking station may provide a power adapter that powers the laptop computer, expanded human interface devices, such as an ergonomic keyboard or mouse, large capacity data storage, larger and/or multiple display devices or monitors, and the like. The access points each represent data communication nodes that can be wirelessly connected to the other elements of the associated connected environments, and that provide connectivity to a wider data network, such as the Internet, a corporate internet, a local area network (LAN), a wide area network (WAN), or the like. As such, the access points may be understood to provide connectivity to a corporate data network, a remote desktop environment, a cloud computing environment, a data or streaming service, or the like. It will be understood that, while the data communication link between the information handling systems and the docking stations are illustrated as being wireless data communication links, there may be other data communication links, such as wired links, between the information handling systems and the docking stations, or between other elements of the associated connected environments, as needed or desired. Moreover, as described herein, the wireless data communication links may be understood to include wireless data communication links as defined by one or more Bluetooth standard, one or more IEEE 802.11 standard, one or more cellular data standards, or the like, as needed or desire.

Figure 1:
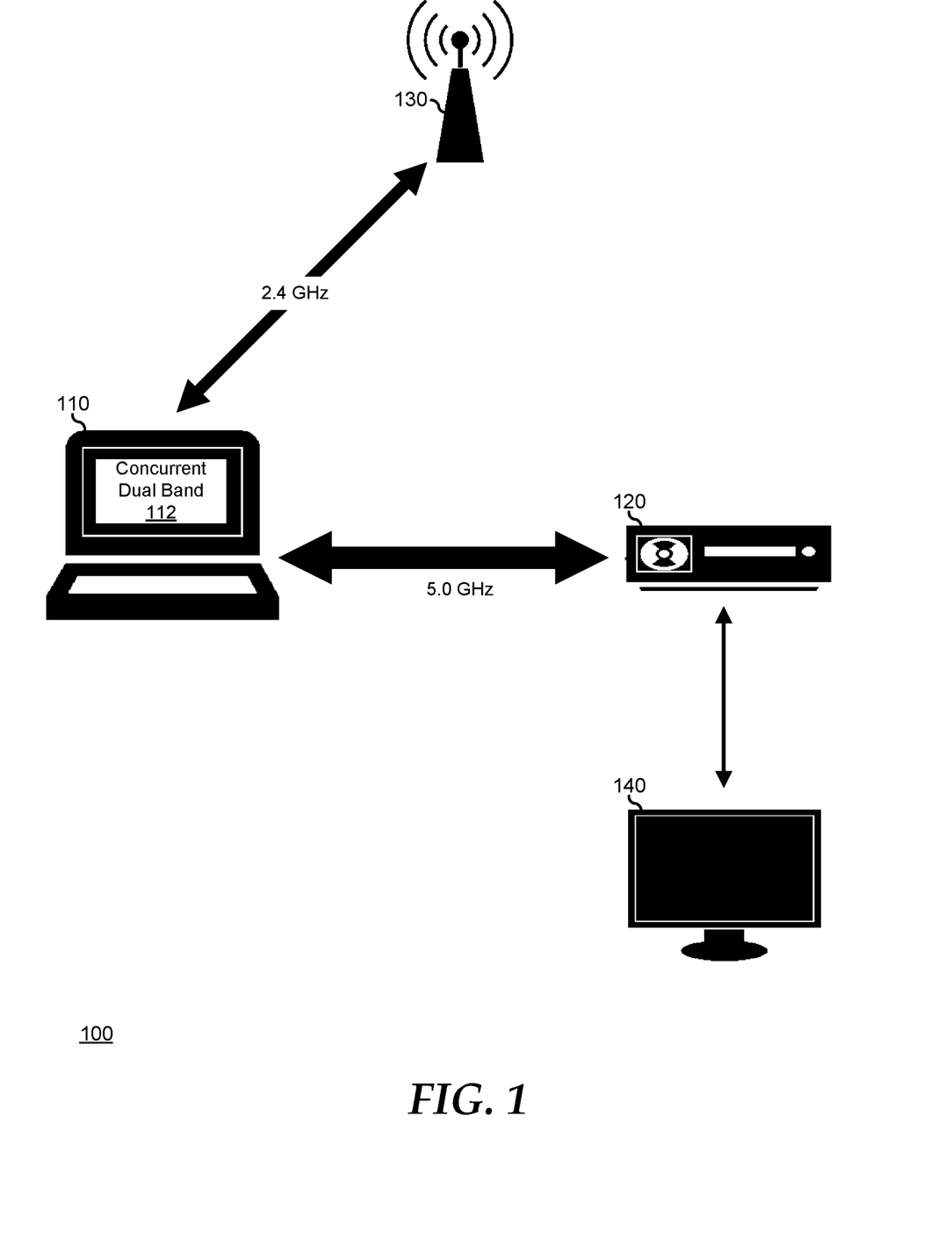
FIG. 1 is a block diagram illustrating an information handling system according to an embodiment of the current disclosure.

FIG. 1 illustrates a connected environment 100 including an information handling system 110, a docking station 120, an access point 130, and one or more monitors 140. Information handling system 110 includes a CDB radio 112. Here, CDB radio 112 operates to provide a first data communication link on the 2.4 GHz band with access point 130 and a second data communication link on the 5.0 GHz band with docking station 120. Connected environment 100 may typify a usage model where only information handling system 110 includes CDB radio 112, and so the options for providing connectivity between the information handling system and docking station 120 and access point 130 are limited, but where the data traffic between the information handling system and the docking station requires the larger bandwidth associated with the 5.0 GHz band. Examples of such a connected environment may include a corporate user docked at a workspace, and that is using a video or storage heavy application natively on the information handling system, with less need for connectivity to the access point, or a gaming user who needs lower bandwidth to connect to a gaming community via the access point, but needs the higher bandwidth for rendered video to the monitor. A similar embodiment, not illustrated, may be easily envisioned where CDB radio 112 operates to provide a first data communication link on the 5.0 GHz band with access point 130 and a second data communication link on the 2.4 GHz band with docking station 120. An example may include a corporate user docked at a workspace, and that is using a data heavy application hosted via access point 130, such as a remote desktop system, where the rendered video necessitates the use of a lower bandwidth data link between the information handling system and the docking station.

Figure 2:
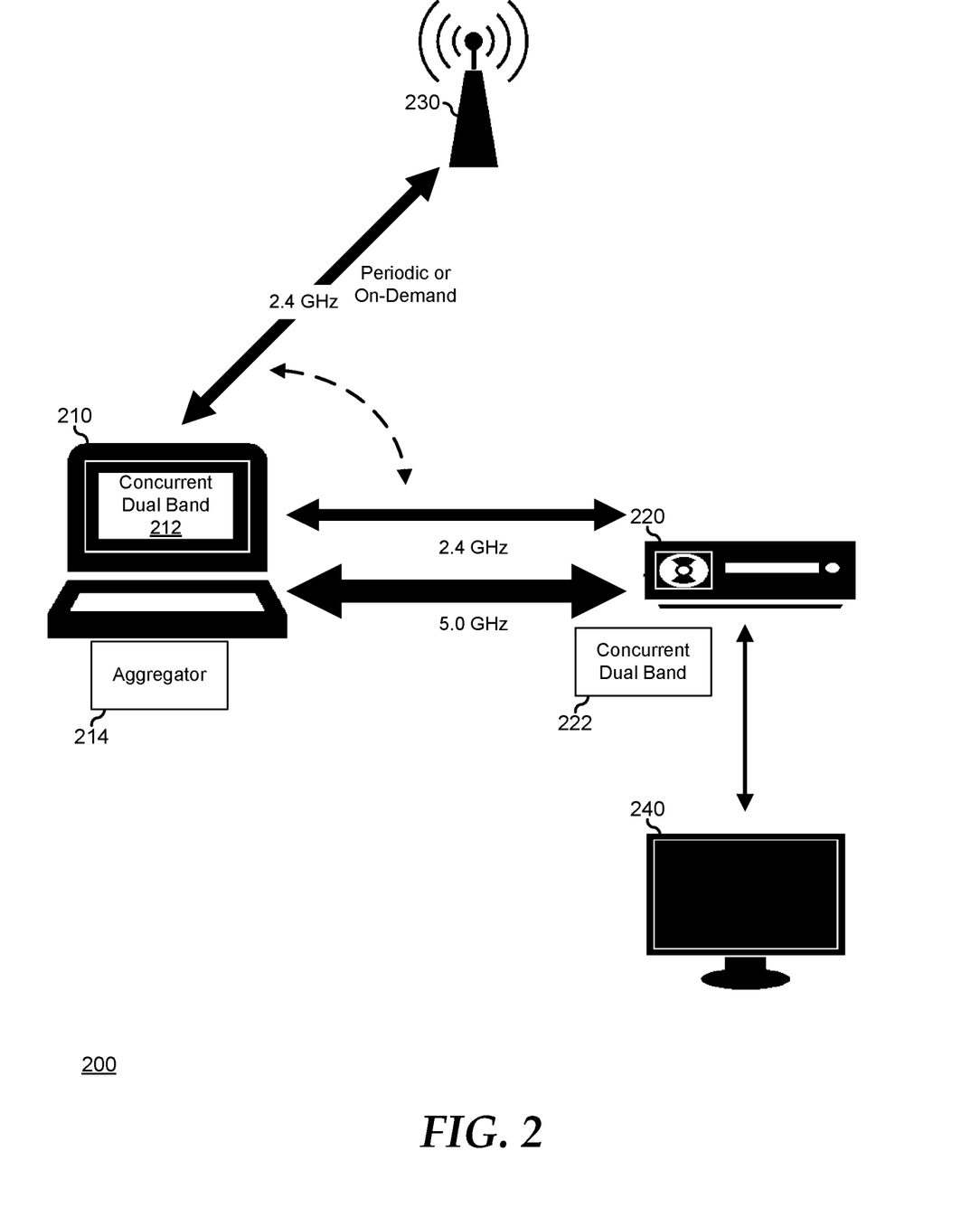
FIGS. 2-5 are block diagrams illustrating an information handling system according to another embodiment of the current disclosure.

FIG. 2 illustrates a connected environment 200 similar to connected environment 100, and including an information handling system 210 similar to information handling system 110, a docking station 220 similar to docking station 120, an access point 230 similar to access point 130, and one or more monitors 240 similar to monitor 140. Here, docking port 220 includes a CDB radio 222, and information handling system 210 includes a link aggregator 214. Link aggregator 214 operates to selectively manage the data communication links between information handling system 210 and docking station 220 and access point 230. As illustrated, CDB radio 212 establishes a wireless data communication link with docking station 220 via the 5.0 GHz band, and link aggregator 214 selectively directs the CDB radio to establish a wireless data communication link via the 2.4 GH frequency band with either the docking station or with access point 230.

In a first case, link aggregator 214 operates to direct CDB radio 212 to switch the 2.4 GHZ link between docking station 220 and access point 230 on a periodic basis. For example, link aggregator 214 can operate to direct CDB radio 212 to maintain the 2.4 GHz link with docking station 220, and to only establish the 2.4 GHZ link with access point 230 occasionally, to "check in" with the resources associated with the access point. In a second case, link aggregator 214 operates to direct CDB radio 212 to switch the 2.4 GHz link between docking station 220 and access point 230 on an on-demand basis when information handling system 210 needs to access the resources associated with the access point. In a third case, link aggregator 214 operates to determine context information for the usage of information handling system 210 and the other elements of connected environment 200, and to direct CDB radio 212 to switch the 2.4 GHz link between docking station 220 and access point 230 when the context dictates it. For example, when the user of information handling system 200 is performing activities that necessitate more constant communication with the resources associated with access point 230, link aggregator 214 can operate to direct CDB radio 212 to establish the 2.4 GHz link with the access point, but when the user is performing activities that necessitate greater bandwidth communication with docking station 220, the link aggregator can direct the CDB radio to establish the 2.4 GHz link with the docking station. Note that, when link aggregator 214 directs CDB radio 212 to establish the 2.4 GHz link between information handling system 210 and docking station 220, the link aggregator also operates to manage the combination of the 2.4 and 5.0 GHz links as separate data communication links, or as a single high-bandwidth data communication link as needed or desired. It will be further understood that link aggregator 214 operates to manage the 5.0 GHz link, directing CDB radio 212 to switch between docking station 220 and access point 230 as needed or desired, and can do so on a periodic basis, on an on-demand basis, or based upon the operating context of connected environment 200 as needed or desired.

Figure 3:
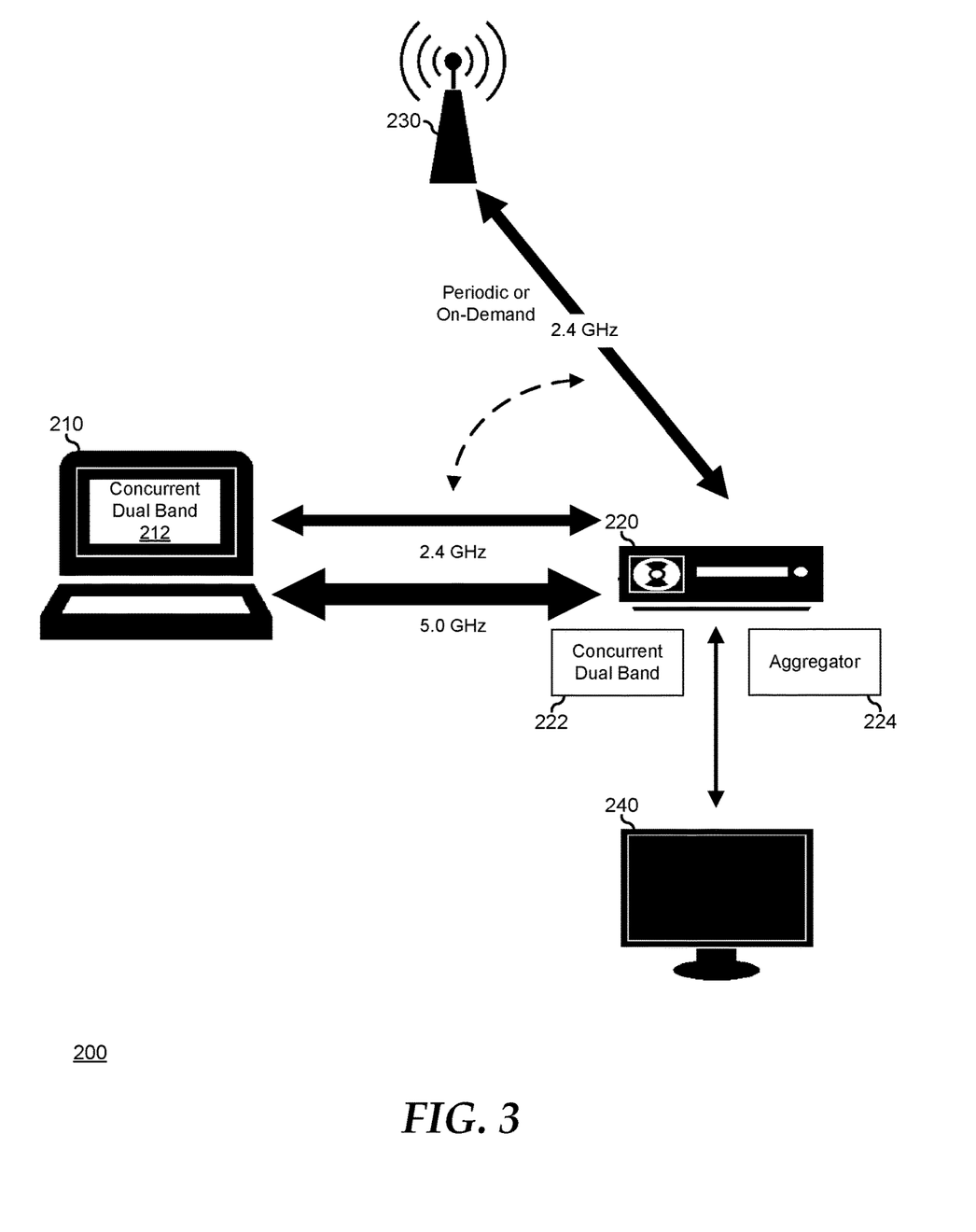

FIG. 3 illustrates connected environment 200 in another configuration. Here, docking station 220 includes a link aggregator 224 similar to link aggregator 214 in FIG. 2. As such, link aggregator 224 operates to selectively manage the data communication links between docking station 220 and information handling system 210 and access point 230. As illustrated, CDB radio 222 establishes a wireless data communication link with information handling system 210 via the 5.0 GHz band, and link aggregator 224 selectively directs the CDB radio to establish a wireless data communication link via the 2.4 GH frequency band with either information handling system 210 or with access point 230. As with link aggregator 214 as described above, link aggregator 214 can operates to direct CDB radio 222 to switch the 2.4 GHz link between information handling system 210 and access point 230 on a periodic basis, on an on-demand basis, or based upon context information for the usage of information handling system 210 and the other elements of connected environment 200. Note that, when link aggregator 224 directs CDB radio 222 to establish the 2.4 GHz link between information handling system 210 and docking station 220, the link aggregator also operates to manage the combination of the 2.4 and 5.0 GHz links as separate data communication links, or as a single high-bandwidth data communication link as needed or desired. It will be further understood that link aggregator 224 operates to manage the 5.0 GHz link, directing CDB radio 222 to switch between information handling system 210 and access point 230 as needed or desired, and can do so on a periodic basis, on an on-demand basis, or based upon the operating context of connected environment 200 as needed or desired.

Figure 4:
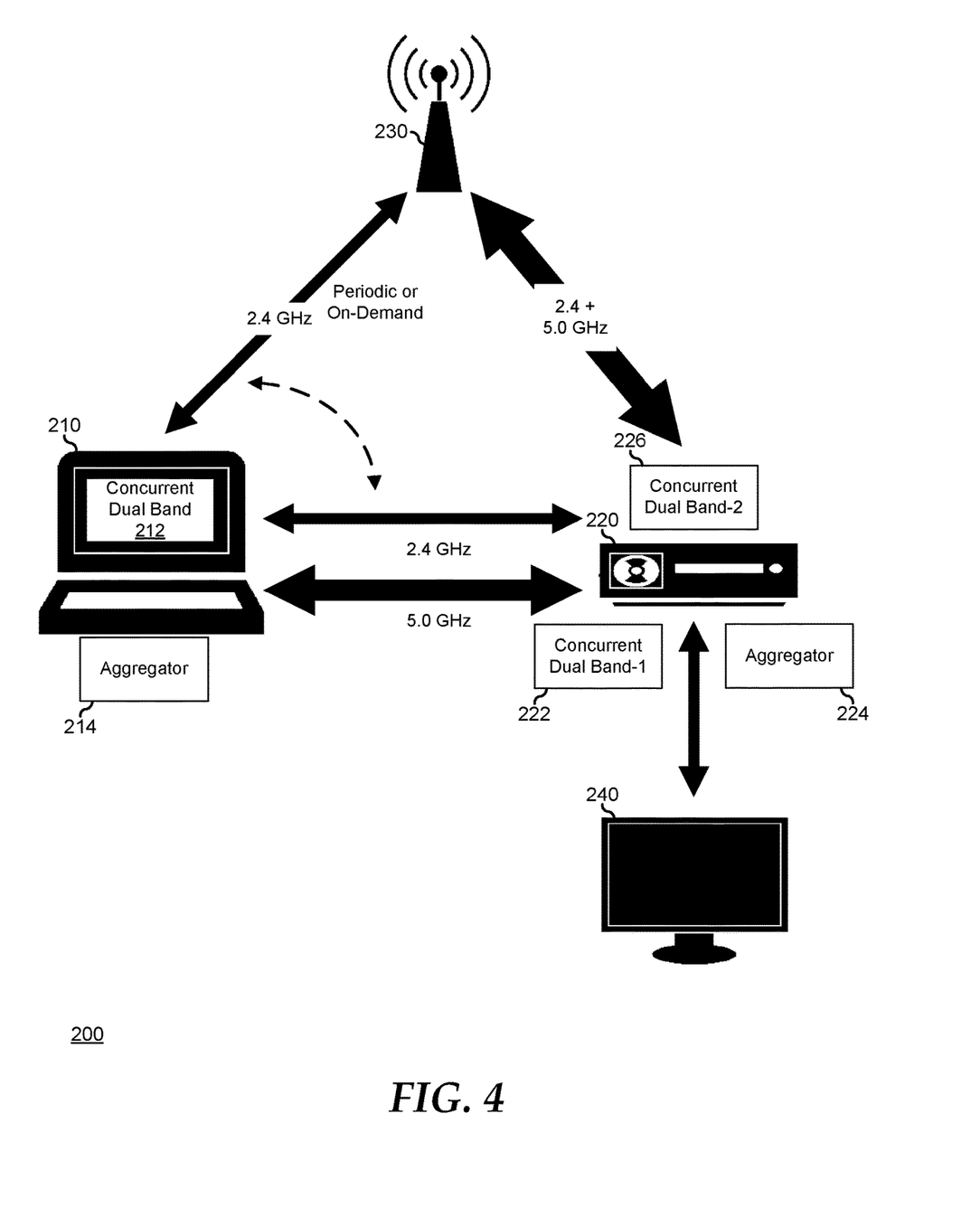

FIG. 4 illustrates connected environment 200 in another configuration, where docking station 220 includes a second CDB radio 226 similar to CDB radio 222. In this configuration, link aggregator 214 operates as described above with reference to FIG. 2, directing CDB radio 212 to switch the 2.4 GHz and 5.0 GHz links as needed or desired. In addition, aggregator 224 directs CDB radio 226 to establish the 2.4 GHz link with either docking station 220 or with access point 230. Here, docking station 220 is provided with a high-bandwidth data communication link with the infrastructure associated with access point 230. This configuration may be advantageous where docking station 220 operates to provide auxiliary processing capabilities for information handling system 210, such as direct video streaming offload, conference room device management, or other offloads as needed or desired, or where the docking station is connected to a network associated with access point 230 through a static wireless backhaul, or the like.

Figure 5:
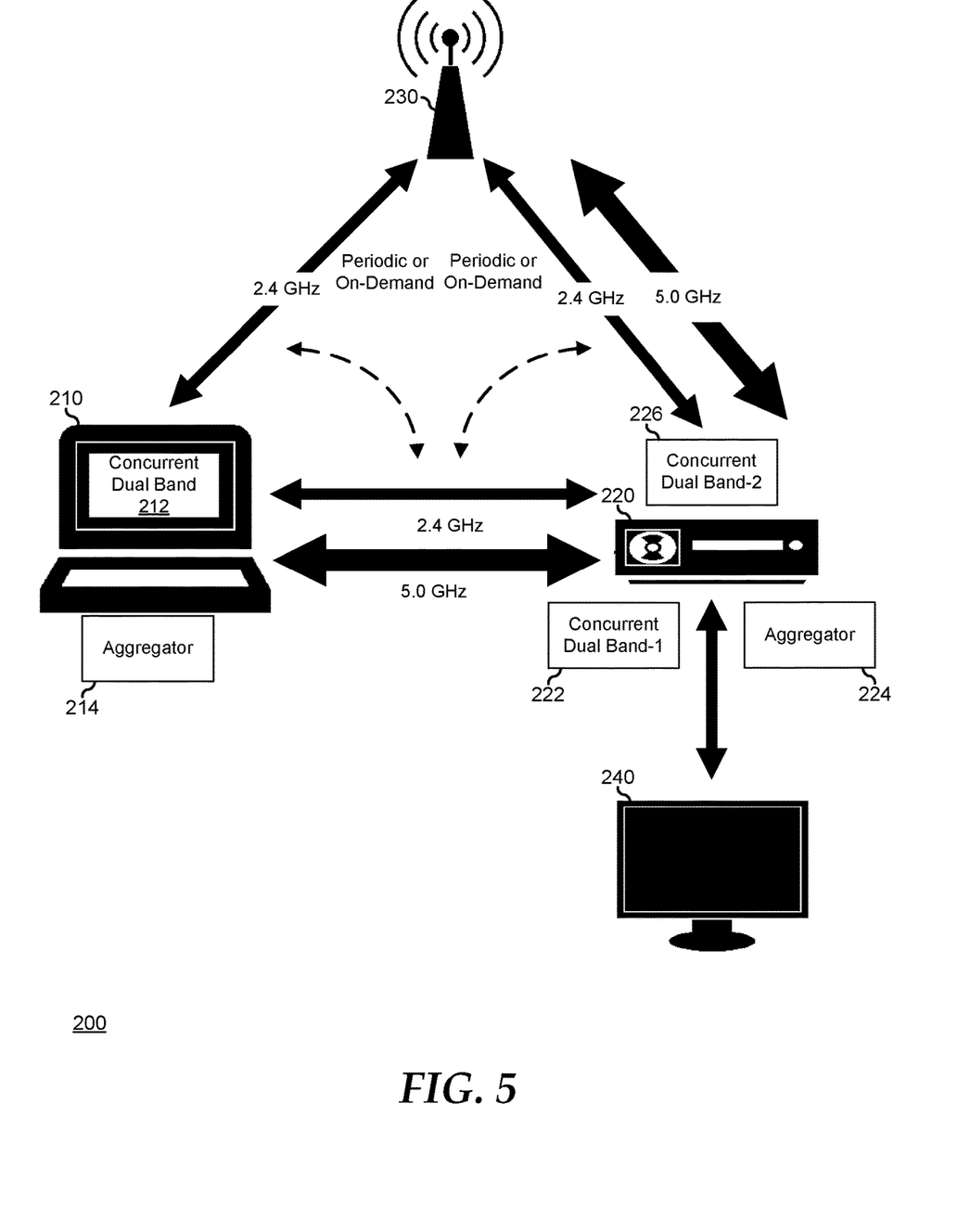

FIG. 5 illustrates connected environment 200 in a similar configuration as described above with respect to FIG. 4. Here link aggregator 214 operates as described above with reference to FIG. 2, directing CDB radio 212 to switch the 2.4 GHz and 5.0 GHz links as needed or desired. Moreover, link aggregator 224 operates as described above with reference to FIG. 3, directing CDB radio 222 to switch the 2.4 GHz and 5.0 GHz links as needed or desired. Here, link aggregator 214 and link aggregator 224 operate to communicate with each other to coordinate the management of CDB radios 212, 222, and 226 to optimize the performance of connected environment 200 based upon the user context. For example, link aggregator 214 and link aggregator 224 can communicate via one of the 2.4 GHz or 5.0 GHz links between information handling system 210 and docking station 220, via a side-band data communication link, such as a network cable, a personal area network (PAN) data communication link like a Bluetooth or near-field communication (NFC) data communication link or the like, or via another side-band data communication link, as needed or desired. Information shared between link aggregator 214 and link aggregator 224 may include communication control information, capability negotiation information, contextual or usage information, link aggregation mode information, or the like. In this configuration, connected environment 200 retains a high degree of flexibility to adaptively enable/disable the various link aggregation modes between information handling system 210 and docking station 220, between the information handling system and access point 230, and between the docking station and the access point in order to optimize the user experience for quality of service (QoS), bandwidth, latency, performance, or other experience metrics, as needed or desired.

In each of the above-described embodiments and use cases, link aggregators are configured to utilize context information of the associated connected environment and the elements thereof, in order to maximize the user experience. As used herein, context information may include the selected application or user working mode, various performance metrics on the information handling system or docking station, such as application performance, hardware resource performance (e.g., CPU performance, memory performance, storage performance, network performance, wireless link performance, and the like), data communication link performance (e.g., link bandwidth, link latency, link QoS, and the like), or other performance metrics as needed or desired. In particular, one or more link aggregator may operate to gather link telemetry and path configuration information for all of the data communication links within the connected system, including both wired and wireless data communication links. Such link telemetry and configuration information may include link permanence, that is, the ability, either by hardware configuration or link policy, to establish or break the various data communication links. Note that, as illustrated herein, the link aggregators operate to manage the wireless data communication links. However, this illustration is not intended to limit the scope of the current invention, and link aggregators will likewise be understood to manage wired data communication links within the connected environment, as well.

In a particular embodiment, link aggregator 214 operates to determine the maximum bandwidth and QoS for each combination of wired or wireless data communication links between information handling system 210 and docking station 220, and between the information handling system and access point 230. Link aggregator 214 further manages a QoS reservation table (QOSRT) that defines the QoS needed for each application, and that defines critical applications and application priorities. Link aggregator 214 further defines bandwidth thresholds for each combination of wired and wireless data communication links, such that, when a bandwidth threshold is reached or exceeded, the link aggregator triggers an aggregation and load balancing algorithm to determine changes to the link configurations. Link aggregator 214 further maintains a dynamic network consumption and capacity table (DNCCT) per application and per link configuration. Link aggregator 214 further monitors steady state bandwidth usage, highest burst bandwidth usage, and latency for the currently configured data communication link configuration, and estimates the steady state bandwidth usage, highest burst bandwidth usage, and latency for the currently configured data communication link configuration for the mix of applications operating on information handling system 210. Finally, link aggregator 214 communicates and coordinates configuration changes with link aggregator 224. Link aggregator 224 operates similarly to link aggregator 214, with respect to the wired and wireless data communication links maintained by docking station 220.

Within link aggregator 214 and link aggregator 224, the link aggregation and load-balancing process is triggered by one or more of a watchdog timer, a determination that one or more wired or wireless data communication link is dynamically exceeding its bandwidth threshold, the receipt of a re-balance request from docking station 220 or another device of connected environment 200, or another trigger event, as needed or desired. When the link aggregation and load-balancing process is initiated, link aggregator 214 can operate to do one or more of sort the QOSRT by active application requirements as determined by the DNCCT, determine if the average bandwidth is trending upward or downward, determine the QoS and latency requirements for the data communication links of the current configuration, and execute a decision matrix. The decision matrix can include determining to retrieve the current network telemetry, average bandwidth and latency, and predict the network bandwidth and latency based upon the current data communication link configuration. A pseudocode flow for the link aggregation and load-balancing process may be given as:

```
If (Predictive Bandwidth && QoS) not serviceable in [Current IHS Mode of Operation]
  { Look up new Mode of Operation to satisfy bandwidth && QoS trend;
    Dispatch new DS requirements to Dock/Peer;
    Process new IHS DS & AP network topology changes;
    Update Current_IHS_Mode_of_Operation variable;
  }
Reset {Watchdog Timer};
Return;
```

As noted above, the information handling systems as described herein represent mobile computing devices, such as laptop computers, smart phones, tablet devices, or the like. As such, it will be understood that such an information handling system may not always be expected to be a part of a connected environment as described herein. Thus it will be further understood that such information handling systems will be periodically disconnected from and reconnected to a connected environment. Thus when an information handling system is reconnected to a connected environment, the link aggregator of the information handling system will perform an initialization process in order to prepare for the management of the data communication links as described above. Where the docking station does not include a link aggregator, the link aggregator in the information handling system operates to determine that it is the only link aggregator in the connected environment, and proceeds to manage the data communication links as described above with respect to FIG. 2. Similarly, when an information handling system that does not include a link aggregator is reconnected to a connected environment, a link aggregator of the docking station will perform an initialization process in order to prepare for the management of the data communication links as described above. Here, the link aggregator in the docking station operates to determine that it is the only link aggregator in the connected environment, and proceeds to manage the data communication links as described above with respect to FIG. 3. When an information handling system with a link aggregator connects to a docking station which also has a link aggregator, the link aggregators share information related to the data communication links that can be maintained by the respective link aggregators, and the link aggregator in the information handling system provides information as to the usage context to the link aggregator in the docking station, and the link aggregators proceed to manage the data communication links as described above with respect to FIGS. 4 and 5.

Figure 6:
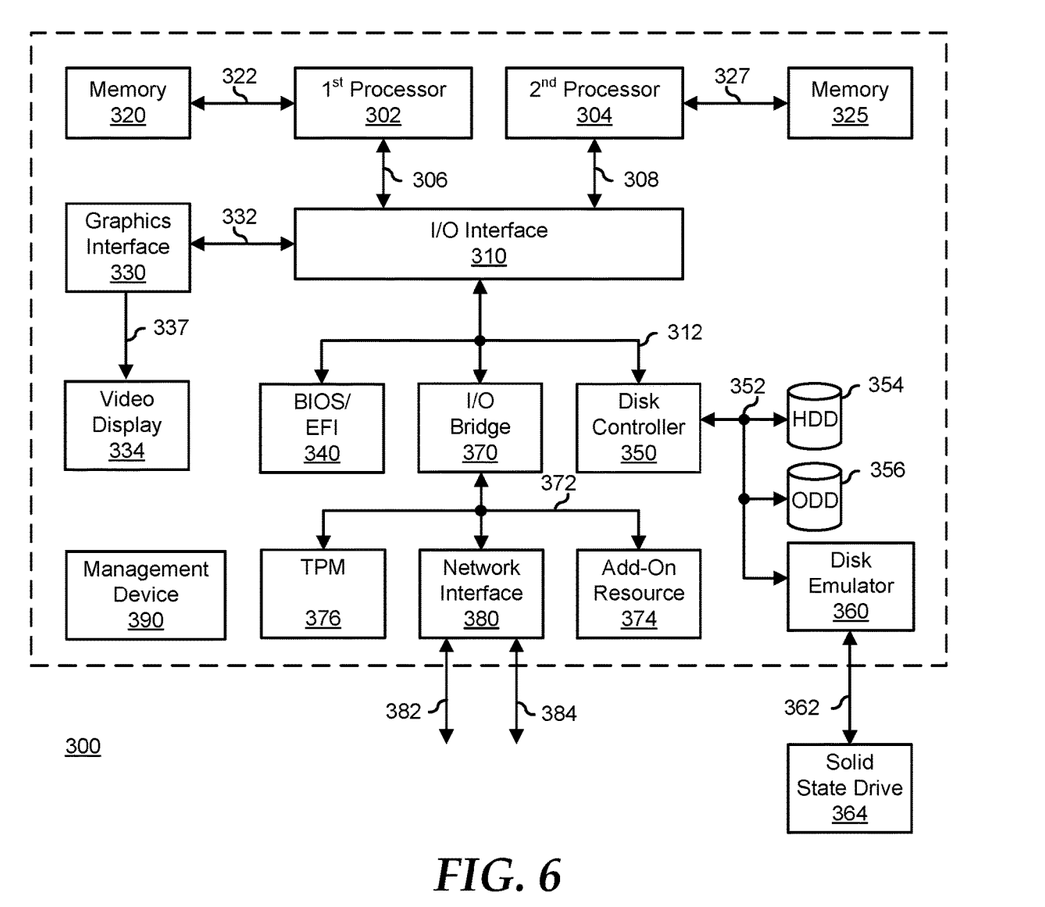
FIG. 6 is a block diagram illustrating a generalized information handling system according to another embodiment of the current disclosure.

FIG. 6 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a first concurrent dual band radio configured to establish a first data link on a first frequency band and to concurrently establish a second data link on a second frequency band different from the first frequency band;
a second concurrent dual band radio configured to establish a third data link on the first frequency band and to concurrently establish a fourth data link on the second frequency band different from the first frequency band; and
a link aggregator configured in a first mode to establish the first data link and the second data link with a first remote device and to establish the third data link with a second remote device, and in a second mode to establish the first data link with the first remote device and to establish the third data link and the fourth data link with the second remote device different from the first remote device.

2. The information handling system of claim 1, wherein the link aggregator is further configured to determine that an operating context of the information handling system has changed, and to switch from the first mode to the second mode in response to determining that the operating context has changed.

3. The information handling system of claim 2, wherein the change in the operating context includes launching an application on the information handling system.

4. The information handling system of claim 2, wherein the change in the operating context includes a change is a data throughput rate on the first data link.

5. The information handling system of claim 2, wherein the change in the operating context includes a change in a network latency on the first data link.

6. The information handling system of claim 1, wherein the link aggregator is further configured to periodically switch between the first mode and the second mode.

7. The information handling system of claim 1, wherein the link aggregator is further configured to determine that the information handling system needs to access the second remote device, and to switch from the first mode to the second mode in response to determining that the information handling system needs to access the second remote device.

8. The information handling system of claim 1, wherein the link aggregator is further configured to receive an input directing the link aggregator to switch between the first mode and the second mode, and to switch from the first mode to the second mode in response to receiving the input.

9. The information handling system of claim 8, wherein the input is a user input.

10. A method, comprising:
providing, on an information handling system, a first concurrent dual band radio configured to establish a first data link on a first frequency band and to concurrently establish a second data link on a second frequency band different from the first frequency band;
providing, on the information handling system, a second concurrent dual band radio configured to establish a third data link on the first frequency band and to concurrently establish a fourth data link on the second frequency band;
establishing, in a first mode, the first data link and the second data link with a first remote device, and the third data link with a second remote device different from the first remote device; and
establishing in a second mode the first data link with the first remote device and the third data link and the fourth data link with the second remote device.

11. The method of claim 10, further comprising:
determining that an operating context of the information handling system has changed; and
switching from the first mode to the second mode in response to determining that the operating context has changed.

12. The method of claim 11, wherein the change in the operating context includes launching an application on the information handling system.

13. The method of claim 11, wherein the change in the operating context includes a change is a data throughput rate on the first data link.

14. The method of claim 11, wherein the change in the operating context includes a change in a network latency on the first data link.

15. The method of claim 10, further comprising:
periodically switching between the first mode and the second mode.

16. The method of claim 10, further comprising:
determining that the information handling system needs to access the second remote device; and
switching from the first mode to the second mode in response to determining that the information handling system needs to access the second remote device.

17. The method of claim 10, further comprising:
receiving an input directing the link aggregator to switch between the first mode and the second mode; and
switching from the first mode to the second mode in response to receiving the input.

18. The method of claim 17, wherein the input is a user input.

19. A system, comprising:
an access point;
a docking station including:
a first concurrent dual band radio configured to establish a first data link on a first frequency band and to concurrently establish a second data link on a second frequency band different from the first frequency band;
a second concurrent dual band radio configured to establish a third data link on the first frequency band and to concurrently establish a fourth data link on the second frequency band different from the first frequency band; and
a first link aggregator; and
an information handling system including:
a third concurrent dual band radio configured to establish a fifth data link on the first frequency band and to concurrently establish a sixth data link on the second frequency band; and
a second link aggregator;
wherein:
the first link aggregator is configured in a first mode to establish the first data link and the second data link with the access point and to establish the third data link with the information handling system, and in a second mode to establish the first data link with the access point and to establish the third data link and the fourth data link with the information handling system; and the second link aggregator is configured in a third mode to establish the fifth data link and the sixth data link with the docking station, and in a fourth mode to establish the fifth data link with the docking station and to establish the sixth data link with the access point.

20. The system of claim 19, wherein the first link aggregator is further configured to determine that an operating context of the information handling system has changed, and to switch from the first mode to the second mode in response to determining that the operating context has changed.

* * * * *